July 20, 1948.  G. DE W. MILES  2,445,685

CAKE MAKE-UP CONTAINER

Filed Oct. 13, 1945

INVENTOR
GILBERT DeWAYNE MILES
BY
George H. Mortimer
ATTORNEY

Patented July 20, 1948

2,445,685

UNITED STATES PATENT OFFICE 2,445,685

CAKE MAKE-UP CONTAINER

Gilbert De Wayne Miles, New York, N. Y., assignor to Colgate-Palmolive-Peet Company, Jersey City, N. J., a corporation of Delaware Application October 13, 1945, Serial No. 622,185

1 Claim. (Cl. 132—79)

The present invention relates to a cake make-up container.

Cake make-up is a well known cosmetic preparation widely used as a make-up base. Essentially it comprises a powder base, fatty materials such as fats, oils, waxes, lanolin, etc., and a dispersing agent. The powder base comprises, in addition to powdered filler, pigment and usually also perfume. The cake make-up formula may also include a water-soluble plasticizing agent such as glycerine, diethyleneglycol, "Carbowax," or similar polyhydroxy compounds. The cake make-up ingredients, after thorough mixing and blending, are pressed into cake form. In use an applicator, usually a sponge, is moistened in water, rubbed over the surface of the cake where a part becomes detached from the cake and suspended in the moisture. This suspension is then transferred by means of the applicator to, and is spread on, the skin to be made up.

Present containers do not provide any way to take care of the sponge applicator. Users have been forced to use auxiliary moisture proof bags in which to carry the moist sponges, or to carry a supply of applicators which were used only once and then thrown away, or to resort to other unsatisfactory expedients.

It is an object of the present invention to provide a cake make-up container having separate compartments for the cake make-up and for the sponge applicator. Other objects and advantages of the present invention will become apparent from the following detailed description, taken in conjunction with the drawing, in which.

Generally speaking, the cake make-up container of the present invention comprises a base cup having a partition dividing the container into two compartments, preferably of unequal size. In the larger of the compartments is the compressed cake make-up material. The smaller of the two compartments houses the applicator. A suitable cover is provided to enclose the cake make-up and the applicator within the container.

Figure 1:
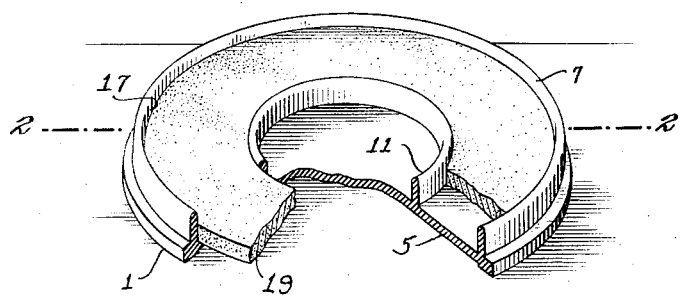
Fig. 1 represents a perspective view of the base cup embodying the present invention.
Figure 2:
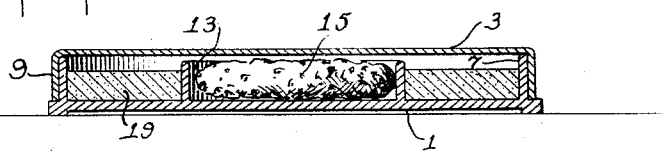
Fig. 2 is a vertical section view of the complete container along the line 2—2 of Fig. 1.
Figure 3:
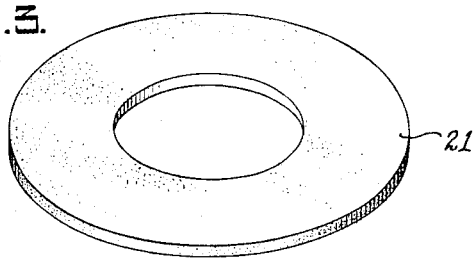
Fig. 3 is a perspective view of a cake make-up annulus which may be sold separately as a refill for the container of Figs. 1 and 2.

Referring now more particularly to Figs. 1, 2 and 3 the cake make-up container illustrated in these figures comprises a base cup 1 and a cover 3. The cup 1 has a bottom wall 5 and an upright wall 7. This upright wall 7 cooperates with a flange 9 on a cover 3 to provide a telescoping joint between the base and the cover. If desired, the cover may be hinged, pivoted or otherwise secured to the base cup.

The geometric contour of the container in plan view may take any of a large number of shapes, e. g., circular, hexagonal, square, rectangular, oblong, etc. Ordinarily a circular contour is preferred. The height of the upright wall 7 may vary over a fairly large range but it is preferred that it not exceed about ⅕ the largest dimension of the container in plan view. Such a container is relatively flat and it lends itself readily to carriage in a pocket, purse or the like.

The base cup is provided with a partition 11 dividing the cup into two compartments of unequal size. In Figs. 1 and 2 the partition is concentric with the upright wall 7, forming a center well 13 adapted to contain an applicator such as the sponge 15. The larger annular compartment 17 contains the compressed cake make-up 19. In making up the container for original sale it is preferred to flow the ingredients, after thorough mixing and blending, into the compartment 17 and to compress the ingredients into the solid compact cake in the container. The cake formed in this way adheres firmly to the bottom and upright walls and does not tend to shift when the applicator is rubbed over the exposed surface. The formulation of the cake make-up forms no part of the present invention and any desired formulation may be used provided it is one to be applied to the skin to be made up, by means of a moistened applicator.

The container may be made of any suitable material. Since the applicator is moistened for use and remains moist in its compartment, the container must be stable to moisture and to a suspension of the cake make-up ingredients in water. There must be nothing in the container material that would taint or react with the cake make-up ingredients. The conditions in the sponge compartment being favorable to mold growth, the container material must resist mold growth. Mechanically the container must have sufficient strength and rigidity to stand the stresses imposed during the compressing of the ingredients. Since the compressed cake of make-up material is rather brittle, the container should not be so flexible under conditions of use as to bend to the point where the cake would crack. On the other hand, the container should not be so fragile as to break if accidentally dropped. The container material must lend itself to ready fabrication, should be pleasing to the eye and preferably low in cost. I have found that certain of the fiberless organic plastics best satisfy these multiple requirements and among those which have been found suitable are polystyrene, acrylates, phenolics and vinylidene chloride. Other materials, e. g., rust resisting metals such as stainless steel, aluminum, precious metals and alloys may be used.

It is advantageous in some cases to provide cake make-up refills to fit into the cake make-up compartment when the original cake has been used up. Such a refill 21 is shown in Fig. 3 which is adapted to fit in compartment 17 of Figs. 1 and 2. The compressed make-up ingredients, if they have sufficient strength to withstand breakage in ordinary handing, may be secured in the container by means of an adhesive, e. g., a layer of adhesive applied to one surface of refill 21. This adhesive may be of the pressure sensitive type or a water-soluble type. If the formulation is such that the compressed cake would break in ordinary handling, the refill is prepared in a simple cup of the same material as the container, or other suitable material, the refill cup having the same outer dimensions as the make-up compartment of the container. Such a refill cup may be held against rotation in the container by friction, cooperating lugs, or any other suitable expedient.

Figure 4:
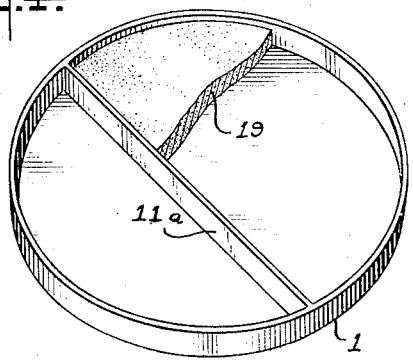
Fig. 4 shows a modification in the form of the base cup embodying the present invention.

The sponge compartment in the base cup 1 need not be centrally located as in Fig. 1 but may be located adjacent to the outside wall as shown in Fig. 4. In this embodiment the partition 11a extends chordwise across the container but it may be arcuate, or of any other desired shape.

The concentric partition arrangement of Fig. 1 has advantages over the arrangement of Fig. 4 in that there are no sharp corners which are difficult to get at with the sponge applicator and the user is practically compelled to rub the applicator uniformly over the entire surface of the cake make-up. This assures a more economical utilization of the cake make-up material.

Although the invention has been described and illustrated in connection with certain specific embodiments of the invention, these have been given by way of illustration rather than limitation. Modifications and variations are contemplated within the scope of the appended claim.

I claim:

A cake make-up container consisting of a cylindrical base cup and a cover only, said base cup having a height less than one-fifth its diameter, and a partition dividing the base cup into only two compartments, one of said compartments being centrally located and adapted to hold a sponge applicator, and the other being larger and adapted to contain a cake of compressed makeup for moist application to the skin of the face, said base cup and partition being a one-piece integral unit made of a fiberless organic plastic.

GILBERT DE WAYNE MILES.

REFERENCES CITED

The following references are of record in the file of this patent:

UNITED STATES PATENTS

| Number | Name | Date |
| --- | --- | --- |
| 1,961,437 | Tuttle et al. | June 5, 1934 |
| 2,121,111 | Wilson | June 21, 1938 |
| 2,147,277 | Younghusband | Feb. 14, 1939 |
| 2,201,035 | Gordon-Stables | May 14, 1940 |